Patented Jan. 5, 1937

2,066,950

UNITED STATES PATENT OFFICE 2,066,950

TRIVALENT POLYMETALLO ARYL COMPOUNDS AND THE PROCESS OF MAKING THEM

Hans Schmidt, Wuppertal-Vohwinkel, Germany, assignor to Winthrop Chemical Company, Inc., New York, N. Y., a corporation of New York No Drawing. Application May 11, 1933, Serial No. 670,559. In Germany May 14, 1932

18 Claims. (Cl. 260—15)

The present invention relates to neutral, water-soluble organo-metal compounds of the arsenic series and to a process of preparing the same, more particularly it relates to neutral, water-soluble derivatives of aminoaryl arseno compounds of the benzene series, the arsenic atom of which is connected with a metal of the group consisting of arsenic, antimony and bismuth in accordance with the following general formula:

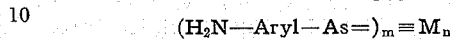

In this formula M stands for arsenic, antimony or bismuth, $m$ and $n$ are whole numbers.

In accordance with the present invention neutral, water-soluble organo-metal compounds are obtained wherein a metal selected from the group consisting of arsenic, antimony and bismuth is attached to the arsenic atom of at least one aromatic arseno radical of the probable formula:

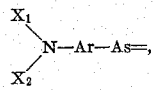

wherein Ar stands for an aromatic radical of the benzene series, $X_1$ stands for an aliphatic group substituted by at least one hydroxyl group, and $X_2$ stands for hydrogen or for an aliphatic group as defined for $X_1$. The said arsenic, antimony or bismuth metal may be further attached to the asenic atom of an aromatic arseno radical of the formula:

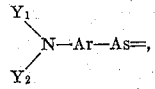

wherein Ar has the same meaning as defined above, $Y_1$ stands for hydrogen or a substituent as defined for $X_1$, and $Y_2$ stands for a

group. Accordingly, the new neutral, water-soluble metal compounds may be constituted in accordance with the following general formulæ:

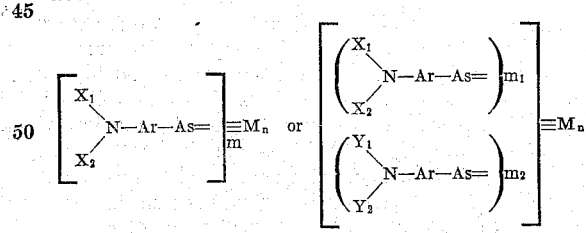

wherein the symbols have the above indicated meaning, $m$, $m_1$ and $m_2$ respectively, and $n$ are whole numbers, $m$, $m_1 + m_2$ respectively, being in general larger than $n$.

A product which corresponds to the latter of the above formulæ is, for instance, the dihydroxypropyl-formaldehyde-bisulfite derivative of an amino-hydroxyphenyl arseno antimony compound of the following probable formula:

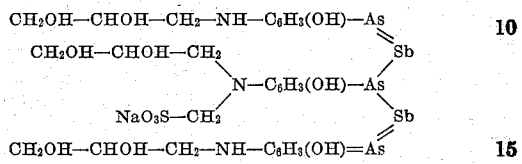

In accordance with my present invention the said new neutral, water-soluble derivatives of amino aryl arseno-arsenic, -antimony and -bismuth compounds are prepared by reacting upon an amino aryl arsine compound of the benzene series with an alkylene oxide in the presence of a solvent and adding to the mixture a halide of the trivalent arsenic, antimony or bismuth at a low temperature. The hydroxyalkyl derivative of the amino aryl arseno-arsenic, -antimony or -bismuth compound thus formed may be isolated from the reaction mixture in the form of its hydrohalic acid salt by pouring the reaction mixture into an organic solvent, such as ether and acetone, in which the said hydrohalic acid salt is insoluble. The reaction probably proceeds, for instance, in accordance with the following equation, when using an aminophenyl-arsine, glycide and arsenic trichloride as reacting components:

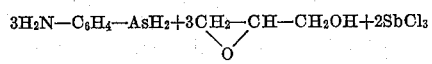

It may be stated that the reaction is not restricted to the proportions indicated in the above equation. Rather, it is possible to combine the said reacting components in such proportions that the arsenic atom attached to the benzene nucleus and the other metal atom which is not directly combined with an organic radical are present in other proportions, such as, for instance, 1:1, 2:1, etc. It is difficult to explain by formulæ in which manner the valences of the metals are saturated in such compounds of other composition.

In the described reaction the amino aryl arsine compounds of the benzene series, such as aminophenyl- and aminohydroxyphenyl-arsines, may be used as such or in the form of their salts, preferably in the form of the acetate. For the sake of brevity these compounds will be referred to in the appended claims as amino-aryl arsines.

As alkylene oxide generally aliphatic compounds containing an alkylene oxide grouping, such as ethylene oxide, propylene oxide, glycide, butylene oxide, dimethylamino-propylene oxide and glucosane may be employed. I prefer that group of alkylene oxides which contain from 3 to 6 carbon atoms, preferably glycide in the manufacture of my new water-soluble derivatives of amino aryl arseno-metal compounds. As the solvent I prefer methyl and ethyl alcohol, also aqueous alcohols may be employed. The arsenic, antimony and bismuth halides, of course, are preferably employed in the form of the normally used chlorides, but, for instance, the bromides may be employed in an analogous manner. The said metal halides may be added in admixture with the alkylene oxide. The hydrohalic acid salts of the reaction product may also be obtained from the reaction mixture by evaporating the solvent in vacuo. However, the isolation of the reaction product by pouring the alcoholic solution into ether or acetone appears particularly advantageous.

In case the replaceable hydrogen atoms of the amino groups of the amino aryl arsine compound are not completely substituted by the aliphatic group containing at least one hydroxyl group in the above described reaction, the reaction products may be further treated with formaldehyde-bisulfite or formaldehyde-sulfoxylate. In order to perform such reaction the hydrohalides obtained in accordance with the above directions are dissolved in water, the solution is treated, while neutralizing the mixture, with the said methane-sulfo derivatives, namely: formaldehyde-bisulfite or formaldehyde-sulfoxylate. In such a reaction a product is formed which contains attached to the amino group of the amino aryl arseno-metal compound beside hydroxyalkyl groups also $NaO_3S-CH_2-$ or $NaO_2S-CH_2-$ radicals. All operations of the above described process should be carried out while excluding oxygen.

In the above described manner yellow to brownish-black substances are obtained, which dissolve in water to neutral solutions. Depending on the reaction time, reaction temperature and the quantity of the alkylene oxide and formaldehyde-bisulfite or formaldehyde-sulfoxylate used, the reaction products contain a different number of hydroxyalkyl and $NaO_3S-CH_2-$ or $NaO_2S-CH_2-$ radicals. The reaction may also be performed by simultaneously acting upon the amino aryl arsine, -arseno-metal compound respectively with the alkylene oxide and formaldehyde-bisulfite or formaldehyde-sulfoxylate.

The said new products wherein part of the arsenic or the antimony or the bismuth is not directly linked to a carbon atom but is bound by means of an arsenic atom are distinguished by a relatively high stability to air, a relatively low toxicity and by particularly high efficiency in the treatment of various infectious diseases, especially in the treatment of bartonellae. The neutral aqueous solutions are suitable for injection.

It may be mentioned that the above described new products can also be prepared by starting with an amino aryl arsonic acid or amino aryl arsenic oxide, treating the same with an alkylene oxide and reducing the product thereby formed in the presence of an inorganic arsenic or antimony compound. It is also possible to start with amino aryl arseno-arsenic, -antimony or -bismuth compounds, that is that with compounds which already contain the arsenic, antimony or bismuth atom attached to the arsenic atom of the amino aryl arseno radical. The said compounds are treated with alkylene oxide in the above described manner. Also in these cases a subsequent treatment with formaldehyde-bisulfite or formaldehyde-sulfoxylate may be performed.

The invention is further illustrated by the following examples, but it is not limited thereto:

*Example 1.*—40 grams of 4-hydroxy-3-aminophenyl-arsine acetate are dissolved in about 450 ccs. of methyl alcohol while adding 40 ccs. of glycide

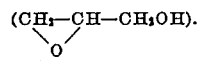

The solution is left standing in a closed vessel for 24 hours. It is then added to a solution of 24 grams of antimony trichloride in 250 ccs. of methyl alcohol at a temperature of −15° C. The temperature is raised to +5° C. and the mixture then poured into acetone while stirring, whereupon the hydrochloride of the arseno-antimony compound separates as an orange-brownish precipitate. Glycide may be added to the antimony trichloride solution before introducing it into the reaction mixture.

40 grams of the hydrochloride thus obtained are dissolved in water, whereupon the hydrochloric acid is neutralized with dilute caustic soda solution, so that the precipitating of the base is just avoided. Hereafter 20 ccs. of 30% formaldehyde solution are added. After a few minutes the solution solidifies to a jelly-like mass. 20 grams of sodium bisulfite are added while stirring and the solution is shaken under coaction of glass balls in a 500 ccs. bottle until solution takes place. The mixture is then neutralized by means of a dilute solution of caustic soda, filtered after standing for a little while and the compound formed is precipitated by pouring the solution into methyl alcohol while stirring. After separating and drying a brown powder which is readily soluble in water with neutral reaction is obtained. The brown solution takes up iodine while decolorizing. It contains about three

radicals and one $NaO_3S-CH_2-$ radical calculated upon 3 arsenic and 2 antimony atoms.

On reducing the quantity and the reaction time of the glycide a product containing less

radicals may be obtained; otherwise the number of $NaO_3S-CH_2-$ radicals may be increased by more intensive treatment with formaldehyde-bisulfite; it is also possible to subject only a part of the arsine necessary for performing the reaction to the pre-treatment with glycide.

The treatment with formaldehyde-bisulfite may be also performed in the following manner:

40 grams of the hydrochloride obtained in accordance with paragraph 1 of this example are dissolved in water, whereupon a dilute solution of caustic soda is added until the reaction is neutral. Thereby the base separates as a voluminous brown precipitate. 40 grams of formaldehyde-bisulfite are added and the mixture is shaken in a completely filled 500 ccs. bottle with coaction of glass balls, until solution has taken place. After standing for 2 days the solution is filtered and the compound formed is precipitated by pouring the solution into methyl alcohol while stirring. After separating and drying in vacuo a brown powder, displaying analogous properties as that obtained in accordance with paragraph 2 of this example, is obtained. It contains about three

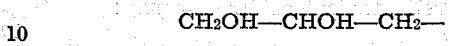

radicals and one $NaO_3S—CH_2—$ radical on 3 arsenic and 2 antimony atoms. Accordingly, it probably corresponds to the formula:

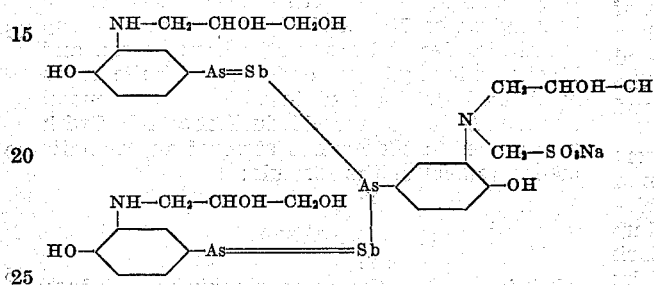

*Example 2.*—40 grams of 4-hydroxy-3-aminophenylarsine acetate are dissolved in about 450 ccs. of methyl alcohol while adding 50 ccs. of glycide. Thereupon the solution is left standing in a closed vessel for 4 days. A solution of 24 grams of antimony trichloride in 250 ccs. of methyl alcohol to which 16 ccs. of glycide have been added is introduced into this solution at about $-15°$ C. The temperture is raised to about $+5°$ C. and the brown colored solution is poured into acetone while stirring. The hydrochloride precipitating is separated and dried in vacuo. It is dissolved in a small quantity of water, neutralized by means of a dilute solution of caustic soda while cooling with ice. The solution is filtered and precipitated by pouring into alcohol while stirring. After separating and drying the precipitate, a light brown powder which is readily soluble in water with neutral reaction is obtained. The compound contains more than 3

$CH_2OH—CHOH—CH_2—$ radicals on 3 arsenic and 2 antimony atoms.

*Example 3.*—4 hydroxy-3-aminophenylarseno-antimony of the probable formula:

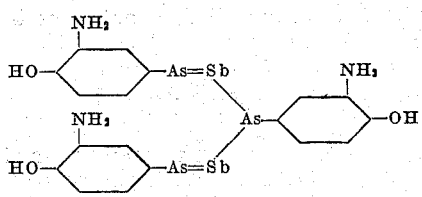

prepared from 20 grams of 4-hydroxy-3-aminophenylarsine acetate and tartar emetic is shaken as a freshly precipitated paste with a solution of 20 grams of formaldehyde-bisulfite and 15 ccs. of glycide. After shaking for a short time solution takes place. After 24 hours the solution is filtered and the compound formed is precipitated by pouring into methyl alcohol while stirring. After separating and drying the precipitate, a brown powder which is readily soluble in water with neutral reaction is obtained.

*Example 4.*—40 grams of 4-hydroxy-3-aminophenylarsine acetate are dissolved in about 450 ccs. of methyl alcohol with the addition of 50 ccs. of glycide. Thereupon the solution is left standing for 4 days. At a temperature of $-15°$ C. the solution is added to a solution of 18 grams of bismuth chloride in 250 ccs. of methyl alcohol, to which solution 16 ccs. of glycide may be added. The temperature is raised to $+5°$ C. and the dark solution is precipitated by pouring into acetone while stirring.

20 grams of the hydrochloride thus obtained are dissolved in water and neutralized while cooling with small pieces of ice by means of a dilute solution of caustic soda. The dark solution thus obtained is filtered and precipitated by pouring into alcohol while stirring. A black-brown powder which is soluble in water with neutral reaction is thus obtained.

*Example 5.*—20 grams of 4-hydroxy-3-aminophenylarsine acetate are transformed into the 4-hydroxy-3-aminophenylarseno-arsenic (compare U. S. application Serial No. 622,832, Example 4). The paste obtained is shaken with 30 grams of formaldehyde-sulfoxylate and 20 ccs. of glycide in the presence of water. After a few hours solution takes place. After about 24 hours the filtered solution is precipitated by pouring into methyl alcohol while stirring. After separating and drying the precipitate in vacuo, a brownish-yellow powder which is readily soluble in water with neutral reaction is obtained.

In an analogous manner, for instance, 4-aminophenylarseno-arsenic (compare U. S. application Ser. No. 622,832, filed July 15, 1932, Example 4, paragraph 1) may be treated with formaldehyde-bisulphite and glycide or formaldehyde-sulfoxylate and glycide.

*Example 6.*—17 grams of 4-hydroxy-3-aminophenyl-arseno-arsenic-hydrochloride (compare U. S. application Ser. No. 622,832, filed July 15, 1932, Example 2) are dissolved in water, treated with a dilute aqueous solution of caustic soda until the precipitate formed has re-dissolved and 12 ccs. of glycide are added. After a few hours the solution is neutralized with dilute acetic acid whereupon the solution remains clear. 12 grams of formaldehyde-bisulfite are then added and the solution is left standing for 24 hours. The solution is filtered, diluted with methyl alcohol and precipitated by pouring into alcohol while stirring. After separating and drying the precipitate, a light brown powder which is readily soluble in water with neutral reaction is obtained.

*Example 7.*—10 grams of 4-hydroxy-3-aminophenyl-arsine acetate and 10 ccs. of propyleneoxide are dissolved in 20 ccs. of methyl alcohol. After standing for 24 hours a solution of 7 grams of antimony trichloride in 60 ccs. of methyl alcohol is added to the mixture at a temperature of $-15°$ C. The temperature is caused to rise to $+5°$ C. and the brown solution is poured into acetone while stirring. The hydrochloride precipitating is separated and dried. It is dissolved in water, a solution of dilute caustic soda is added while cooling with ice until just no precipitation takes place, and 5.3 ccs. of 30% formaldehyde solution are added. After 5 to 10 minutes 5.3 grams of sodium bisulfite are added and the mixture is shaken. After about 2 hours the solution is neutralized with a dilute aqueous solution of caustic soda, filtered after short standing and precipitated by pouring into methyl alcohol while stirring. A brown powder which is readily soluble in water with neutral reaction is obtained.

*Example 8.*—24 grams of 4-hydroxy-3-aminophenyl-arsine acetate are dissolved in methyl alcohol while adding a methyl alcoholic solution of glucosane obtained from 50 grams of glucose. The solution is kept in a closed vessel for 24 hours and then mixed with a solution of 14.3 grams of antimony trichloride in methyl alcohol while shaking. A brown precipitate which is completed by the addition of ethyl alcohol is obtained. The precipitate is sucked off, washed with alcohol and dried in the exsiccator.

The brown powder is then dissolved in water; the solution is neutralized with a dilute solution of caustic soda, whereupon 19 grams of formaldehyde-bisulfite are added. The solution is filled up to 250 ccs. and shaken. After 24 hours the dark solution obtained is filtered and precipitated by pouring into methyl alcohol while stirring. After separating and drying the arseno-antimony compound is obtained as a brown powder which is readily soluble in water with neutral reaction.

In an analogous manner an arseno-bismuth compound may be obtained by reacting upon the glucosane derivative of 4-hydroxy-3-aminophenyl-arsine with bismuth chloride and formaldehyde-bisulfite.

*Example 9.*—20 grams of 4-hydroxy-3-aminophenyl-arsine acetate are dissolved in methyl alcohol while adding 20 ccs. of alpha-diethylamino-epihydrine. The solution is filled up to 250 ccs. and left standing for 3 days. It is then mixed with a solution of 7 grams of water-free bismuth chloride in 100 ccs. of methyl alcohol at a temperature of $-10°$ C.; the temperature is caused to rise to $-2°$ C., the solution is filtered and precipitated by pouring into acetone while stirring. After separating and drying the precipitate in vacuo, a black powder which is readily soluble in water with neutral reaction is obtained.

*Example 10.*—20 grams of 4-hydroxy-3-aminophenyl-arsine acetate are dissolved in methyl alcohol, while adding 17 ccs. of alpha-diethylaminoepihydrine. The solution is filled up to 250 ccs. and left standing for 3 days. It is then mixed with a solution of 12 grams of antimony trichloride in 120 ccs. of methyl alcohol. An orange colored precipitate is formed which is left standing in carbon dioxide atmosphere while frequently shaking until solution takes place (about half an hour). The red solution thus obtained is filtered and precipitated by pouring into acetone while stirring. After drying in vacuo a powder which is readily soluble in water with weakly acid solution is obtained. For the transformation into a neutrally soluble compound the solution can be dissolved in water, neutralized with a dilute solution of caustic soda and the filtered solution can be precipitated by pouring into acetone while stirring. It is sucked off, washed with acetone and dried in vacuo. The arseno-antimony compound is obtained as a brown powder which is readily soluble in water with neutral reaction.

In an analogous manner an arseno-arsenic compound can be obtained by reacting upon an alpha-diethylamino-beta-hydroxypropyl derivative of the 4-hydroxy-3-aminophenylarsine with arsenic trichloride.

I claim:—

1. Organo-metal compounds, wherein a metal which is selected from the group consisting of arsenic, antimony and bismuth and which is not directly linked to a carbon atom is attached with $m$ valencies to the arsenic atom of at least one aromatic arseno radical of the formula:

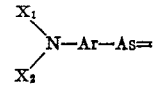

wherein Ar stands for an aromatic radical of the benzene series, $X_1$ stands for an aliphatic group substituted by at least one hydroxy group, and $X_2$ stands for hydrogen or for an aliphatic group as defined for $X_1$, and in which organo-metal compounds the said metal is further attached with $n$ valencies to the arsenic atom of an aromatic arseno radical of the formula:

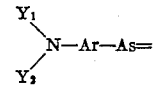

wherein Ar has the same meaning as defined above, $Y_1$ stands for hydrogen or a substituent as defined for $X_1$, and $Y_2$ stands for an $NaO_3S—CH_2—$ or $NaO_2S—CH_2—$ group, and wherein $m$ and $n$ are whole numbers the sum of which is 3, which organo-metal compounds are yellow to brownish black substances and dissolve in water to neutral solutions which are suitable for intravenous injection.

2. Organo-metal compounds, wherein a metal which is selected from the group consisting of arsenic, antimony and bismuth and which is not directly linked to a carbon atom is attached with $m$ valencies to the arsenic atom of at least one aromatic arseno radical of the formula:

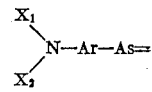

wherein Ar stands for an aromatic radical of the benzene series, $X_1$ stands for an aliphatic group of 3 to 6 carbon atoms substituted by at least one hydroxy group, and $X_2$ stands for hydrogen or for an aliphatic group as defined for $X_1$, and in which organo-metal compounds the said metal is further attached with $n$ valencies to the arsenic atom of an aromatic arseno radical of the formula:

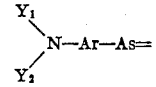

wherein Ar has the same meaning as defined above, $Y_1$ stands for hydrogen or a substituent as defined for $X_1$, and $Y_2$ stands for an $NaO_3S—CH_2—$ or $NaO_2S—CH_2—$ group, and wherein $m$ and $n$ are whole numbers the sum of which is 3, which organo-metal compounds are yellow to brownish black substances and dissolve in water to neutral solutions which are suitable for intravenous injection.

3. Organo-metal compounds, wherein a metal which is selected from the group consisting of arsenic, antimony and bismuth and which is not directly linked to a carbon atom is attached with $m$ valencies to the arsenic atom of at least one aromatic arseno radical of the formula:

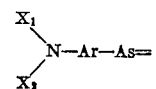

wherein Ar stands for an aromatic radical of the benzene series, X₁ stands for the 1,2-dihydroxypropyl group, and X₂ stands for hydrogen or the dihydroxypropyl group, and in which organo-metal compounds the said metal is further attached with n valencies to the arsenic atom of an aromatic arseno radical of the formula:

wherein Ar has the same meaning as defined above, Y₁ stands for hydrogen or the 1,2-dihydroxypropyl group, and Y₂ stands for a NaO₃S—CH₂— or NaO₂S—CH₂— group, and wherein m and n are whole numbers the sum of which is 3, which organo-metal compounds are yellow to brownish black substances and dissolve in water to neutral solutions which are suitable for intravenous injection.

4. Organo-metal compounds, wherein a metal which is selected from the group consisting of arsenic, antimony and bismuth and which is not directly linked to a carbon atom is attached with m valencies to the arsenic atom of at least one aromatic arseno radical of the formula:

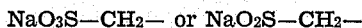

wherein X₁ stands for an aliphatic group substituted by at least one hydroxyl group, and X₂ stands for hydrogen or for an aliphatic group as defined for X₁, and in which organo-metal compounds the said metal is further attached with n valencies to the arsenic atom of an aromatic arseno radical of the formula:—

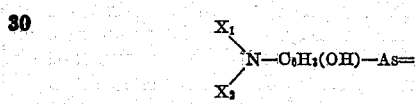

wherein Y₁ stands for hydrogen or a substituent as defined for X₁, and Y₂ stands for a NaO₃S—CH₂— or NaO₂S—CH₂— group, and wherein m and n are whole numbers the sum of which is 3, which organo-metal compounds are yellow to brownish black substances and dissolve in water to neutral solutions which are suitable for intravenous injection.

5. Organo-metal compounds, wherein a metal which is selected from the group consisting of arsenic, antimony and bismuth and which is not directly linked to a carbon atom is attached with m valencies to the arsenic atom of at least one aromatic arseno radical of the formula:

wherein X₁ stands for an aliphatic group of 3 to 6 carbon atoms substituted by at least one hydroxy group, and X₂ stands for hydrogen or for an aliphatic group as defined for X₁, and in which organo-metal compounds the said metal is further attached with n valencies to the arsenic atom of an aromatic arseno radical of the formula:

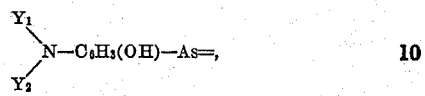

wherein Y₁ stands for hydrogen or a substituent as defined for X₁, and Y₂ stands for a NaO₃S—CH₂— or NaO₂S—CH₂— group, and wherein m and n are whole numbers the sum of which is 3, which organo-metal compounds are yellow to brownish black substances and dissolve in water to neutral solutions, which are suitable for intravenous injection.

6. Organo-metal compounds, wherein a metal which is selected from the group consisting of arsenic, antimony and bismuth and which is not directly linked to a carbon atom is attached with m valencies to the arsenic atom of at least one aromatic arseno radical of the formula:

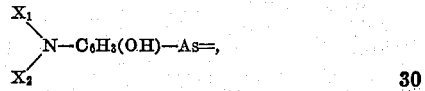

wherein X₁ stands for the 1,2-dihydroxypropyl group, and X₂ stands for hydrogen or the dihydroxypropyl group, and in which organo-metal compounds the said metal is further attached with n valencies to the arsenic atom of an aromatic arseno radical of the formula:

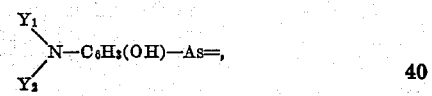

wherein Y₁ stands for hydrogen or the 1,2-dihydroxypropyl group, and Y₂ stands for a NaO₃S—CH₂— or NaO₂S—CH₂— group, and wherein m and n are whole numbers the sum of which is 3, which organo-metal compounds are yellow to brownish black substances and dissolve in water to neutral solutions, which are suitable for intravenous injection.

7. The organo-metal compound about corresponding to the formula $C_{28}H_{37}O_{12}N_3As_3Sb_2SNa$ and probably corresponding to the structural formula:

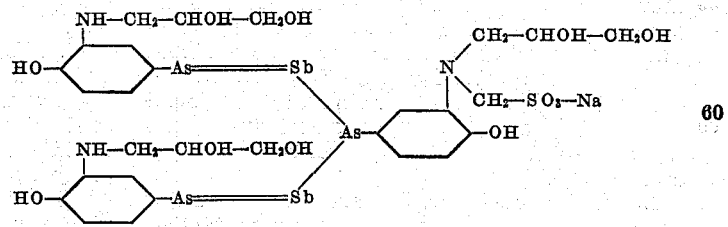

which compound forms a brown powder, dissolves in water to a neutral solution which is suitable for intravenous use and can be obtained by the process claimed in claim 18.

8. In the process of preparing organo-metal compounds, the steps which comprise reacting upon an amino aryl arsine of the benzene series, after it has been treated with an alkylene-oxide in the presence of a monohydric aliphatic alcohol containing from 1 to 2 carbon atoms with a halide of a metal selected from the group consisting of arsenic, antimony and bismuth at low temperature and precipitating the hydrohalic acid salt of the water-soluble hydroxyalkyl derivative of the amino aryl metal compound formed by pouring the mixture into an organic liquid selected from the group consisting of ether and acetone.

9. In the process of preparing organo-metal compounds, the steps which comprise reacting upon an amino aryl arsine of the benzene series, after it has been treated with an alkylene-oxide of 3 to 6 carbon atoms in the presence of a monohydric aliphatic alcohol containing from 1 to 2 carbon atoms, with a halide of a metal selected from the group consisting of arsenic, antimony and bismuth at low temperature and precipitating the hydrohalic acid salt of the water-soluble hydroxyalkyl derivative of the amino aryl metal compound formed by pouring the mixture into an organic liquid selected from the group consisting of ether and acetone.

10. In the process of preparing organo-metal compounds, the steps which comprise reacting upon an amino aryl arsine of the benzene series, after it has been treated with glycide in the presence of a monohydric aliphatic alcohol containing from 1 to 2 carbon atoms, with a halide of a metal selected from the group consisting of arsenic, antimony and bismuth at low temperature and precipitating the hydrohalic acid salt of the water-soluble hydroxyalkyl derivative of the amino aryl metal compound formed by pouring the mixture into an organic liquid selected from the group consisting of ether and acetone.

11. In the process of preparing organo-metal compounds, the steps which comprise reacting upon an amino-hydroxyphenyl arsine, after it has been treated with an alkyleneoxide in the presence of a monohydric aliphatic alcohol containing from 1 to 2 carbon atoms with a halide of a metal selected from the group consisting of arsenic, antimony, and bismuth and precipitating the hydrohalic acid salt of the water-soluble hydroxyalkyl derivative of the amino-hydroxyphenyl metal compound formed by pouring the mixture into an organic liquid selected from the group consisting of ether and acetone.

12. In the process of preparing organo-metal compounds, the steps which comprise reacting upon an amino-hydroxyphenyl arsine, after it has been treated with an alkyleneoxide of 3 to 6 carbon atoms in the presence of a monohydric aliphatic alcohol containing from 1 to 2 carbon atoms, with a halide of a metal selected from the group consisting of arsenic, antimony and bismuth and precipitating the hydrohalic acid salt of the water-soluble hydroxyalkyl derivative of the amino-hydroxyphenyl metal compound formed by pouring the mixture into an organic liquid selected from the group consisting of ether and acetone.

13. In the process of preparing organo-metal compounds, the steps which comprise reacting upon an amino-hydroxyphenyl arsine, after it has been treated with glycide in the presence of a monohydric aliphatic alcohol containing from 1 to 2 carbon atoms, with a halide of a metal selected from the group consisting of arsenic, antimony and bismuth and precipitating the hydrohalic acid salt of the water-soluble hydroxyalkyl derivative of the amino-hydroxyphenyl metal compound formed by pouring the mixture into an organic liquid selected from the group consisting of ether and acetone.

14. The process which comprises reacting upon an amino aryl arsine of the benzene series with an alkyleneoxide of 3 to 6 carbon atoms in the presence of a monohydric aliphatic alcohol containing from 1 to 2 carbon atoms, adding to the mixture a halide of a metal selected from the group consisting of arsenic, antimony and bismuth at low temperature and precipitating the hydrohalic acid salt of the water-soluble hydroxyalkyl derivative of the amino aryl metal compound formed by pouring the mixture into an organic liquid selected from the group consisting of ether and acetone, then reacting upon the said hydroxyalkyl derivative with a methane-sulfo derivative selected from the group consisting of formaldehyde-bisulfite and formaldehyde-sulfoxylate while neutralizing the reaction mixture, and precipitating the reaction product by pouring the solution obtained into an alcohol.

15. The process which comprises reacting upon an amino aryl arsine of the benzene series with glycide in the presence of a monohydric aliphatic alcohol containing from 1 to 2 carbon atoms, adding to the mixture a halide of a metal selected from the group consisting of arsenic, antimony and bismuth at low temperature and precipitating the hydrohalic acid salt of the water-soluble hydroxyalkyl derivative of the amino aryl metal compound formed by pouring the mixture into an organic liquid selected from the group consisting of ether and acetone, then reacting upon the said hydroxyalkyl derivative with a methane-sulfo derivative selected from the group consisting of formaldehyde-bisulfite and formaldehyde-sulfoxylate while neutralizing the reaction mixture, and precipitating the reacton product by pouring the solution obtained into an alcohol.

16. The process which comprises reacting upon an amino-hydroxyphenyl arsine with an alkyleneoxide of 3 to 6 carbon atoms in the presence of a monohydric aliphatic alcohol containing from 1 to 2 carbon atoms, adding to the mixture a halide of a metal selected from the group consisting of arsenic, antimony and bismuth and precipitating the hydrohalic acid salt of the water-soluble hydroxyalkyl derivative of the amino-hydroxyphenyl metal compound formed by pouring the mixture into an organic liquid selected from the group consisting of ether and acetone, then reacting upon the said hydroxyalkyl derivative with a methane-sulfo derivative selected from the group consisting of formaldehyde-bisulfite and formaldehyde-sulfoxylate while neutralizing the reaction mixture, and precipitating the reaction product by pouring the solution obtained into an alcohol.

17. The process which comprises reacting upon an amino-hydroxyphenyl arsine with glycide in the presence of a monohydric aliphatic alcohol containing from 1 to 2 carbon atoms, adding to the mixture a halide of a metal selected from the group consisting of arsenic, antimony and bismuth and precipitating the hydrohalic acid salt of the water-soluble hydroxyalkyl derivative of the amino-hydroxyphenyl metal compound formed by pouring the mixture into an organic liquid selected from the group consisting of ether and acetone, then reacting upon the said hydroxyalkyl derivative with a methane-sulfo derivative selected from the group consisting of formaldehyde-bisulfite and formaldehyde-sulfoxylate while neutralizing the reaction mixture, and precipitating the reaction product by pouring the solution obtained into an alcohol.

18. The process which comprises reacting upon 4-hydroxy-3-aminophenylarsine acetate with glycide in the presence of a monohydric aliphatic alcohol containing from 1 to 2 carbon atoms, adding an alcoholic solution of antimony trichloride at low temperature, pouring the solution obtained into acetone, dissolving the precipitate formed in water while neutralizing with dilute caustic soda solution, reacting upon the mixture obtained with formaldehyde-bisulfite, and pouring the solution formed into a monohydric aliphatic alcohol containing from 1 to 2 carbon atoms.

HANS SCHMIDT.